United States Patent [19]

Nobusawa

[11] 3,852,776
[45] Dec. 3, 1974

[54] CONTROL ARRANGEMENT FOR A CAMERA SHUTTER

[75] Inventor: Tsukumo Nobusawa, Tokyo, Japan

[73] Assignee: Asahi Kogaku Kogyo Kabushiki Kaisha, Tokyo-to, Japan

[22] Filed: Nov. 19, 1973

[21] Appl. No.: 417,130

[30] Foreign Application Priority Data
Nov. 22, 1972  Japan............................ 47-116572

[52] U.S. Cl.................... 354/31, 354/51, 354/60
[51] Int. Cl............................. G03b 7/08, G01j 1/46
[58] Field of Search............. 354/24, 29, 31, 50, 57, 354/60

[56] References Cited
UNITED STATES PATENTS

| | | | |
|---|---|---|---|
| 3,651,744 | 3/1972 | Okada | 354/51 |
| 3,657,979 | 4/1972 | Nobusawa | 354/51 |
| 3,670,637 | 6/1972 | Mori et al. | 354/51 X |
| 3,678,825 | 7/1972 | Nobusawa | 354/60 X |
| 3,682,057 | 8/1972 | Sato | 354/31 |
| 3,712,192 | 1/1973 | Ono et al. | 354/51 |
| 3,721,167 | 3/1973 | Ogiso | 354/31 |

*Primary Examiner*—Joseph F. Peters, Jr.
*Attorney, Agent, or Firm*—Christie, Parker & Hale

[57] ABSTRACT

A camera shutter mechanism is controlled as to exposure time in accordance with the amount of light from an object to be photographed and with an exposure factor such as film speed. First and second tandem-connected timing circuits are separately controlled in operation respectively to define in succession first and second sub-intervals of the exposure time with the first sub-interval having a duration which is dependent upon the amount of light but is independent of the exposure factor and with the second sub-interval having a duration which is dependent upon both the amount of light and the exposure factor.

5 Claims, 7 Drawing Figures

CONTROL ARRANGEMENT FOR A CAMERA SHUTTER

BACKGROUND OF THE INVENTION

This invention relates generally to automatic exposure-time control of camera shutters, and it relates particularly to an improved arrangement for taking into account an exposure factor such as film speed in controlling exposure time.

Exposure-time control devices have been proposed in the past, particularly for use in cameras having focal-plane shutters. Such a shutter includes front and rear shutter curtains that move in spaced relationship with each other. Upon actuation of a camera shutter button, the front shutter curtain begins to move while the rear shutter curtain is held in place. Thereafter, incident to electrical control of an electromagnet operatively associated with it, the rear shutter curtain is released and starts to follow in the same path behind the front shutter curtain.

Conventionally, an exposure-time control device includes a single timing circuit for delaying the electrical control of the electromagnet for an interval of time the duration of which depends upon both object light and an exposure factor such as film speed. The operation of such a control device is generally as follows. Before the shutter button is depressed, as for example while the photographer is focusing, the object brightness is sensed by a photoconductor. A memory capacitor is charged by current flowing out of a network including the photoconductor whereby a control voltage is stored by the capacitor. In synchronism with the shutter release operation, the single timing circuit, by means of a switching operation, is made responsive to the control voltage and thereafter is operative to define an interval of time having a duration that depends upon the control voltage.

A problem exists in the prior art arrangements with regard to the need to take into account an exposure factor such as film speed (i.e., ASA number). To explain this problem, there is shown in FIGS. 1 and 2 and described hereinafter a typical arrangement of the prior art. As shown in the block diagram of FIG. 1, a photoelectric conversion and logarithmic compression circuit 1 provides a signal to an exposure factor control circuit 2. A memory circuit 3 is provided for coupling the exposure factor control circuit 2 to a front shutter curtain starting logarithmic expansion circuit 4. A rear curtain starting circuit is indicated at 5.

As illustrated in FIG. 2, a power switch 19 is connected in series with the power supply 20. When power switch 19 is closed, a CdS cell 8 detects the light coming through a diaphragm 35 from the object to be photographed. A photoelectrically converted and logarithmically compressed voltage appears at the connecting point between a logarithmic compression diode 9 and the CdS cell 8. The logarithmically compressed voltage is applied to the base electrode of a transistor 10 which together with a variable resistor 11 serves as an emitter-follower circuit. The sliding arm of the variable resistor 11 is switchably connected by a normally closed switch 12 to a memory capacitor 13. With the switch 12 being closed, the voltage developed at the sliding arm provides for charging the memory capacitor 13. The charging of the memory capacitor 13 causes it to store a control voltage.

In contrast to the photographing or object light which varies in accordance with a power-of-2 series, this control voltage varies at constant intervals or in accordance with an arithmetic series. It is therefore possible to effect the shutter time control with respect to the exposure factors such as film sensitivity or ASA number, etc. by dividing the voltage appearing at the variable resistor 11 depending on the exposure factors.

Upon actuation of the shutter release, the switch 12 and a normally closed switch 16 open and the front curtain starts to move. At this moment a timing capacitor 15 starts to be charged with the drain current of a field effect transistor (FET) 14, the internal resistance of the FET thereby serving as a timing resistance. The internal resistance of the FET 14 is determined by the control voltage stored by the memory capacitor and applied to the gate of the FET. Owing to the relationship that exists between FET drain current and gate-source voltage, the drain current is a logarithmic expansion of the control voltage. When the voltage across the timing capacitor 15 reaches a predetermined level, a transistor 17 electrically controls an electromagnet 18 associated with the rear curtain (not shown).

Generally, however, the logarithmic compression section of this circuit arrangement provides only an extremely low compressed voltage which is normally in the range of 10 – 40 millivolts (mv). In a practical circuit, the power supply voltage usually employed is 3 – 6V; thus, it will be appreciated how low is the efficiency of the circuit in terms of its voltage utilization. As a result of using such a low compressed voltage, the circuit is too easily affected by internal and external noise voltages, and even a slight fluctuation in the power supply voltage can directly affect the resulting compressed voltage. In other words, such a compressed voltage is low enough as to be compared with the noise voltage contained in the power supply voltage, so that it is very susceptible to some errors. If the compressed voltage including such an error is applied through a variable resistor, etc. as a control voltage, then a voltage dividing error will also be added, increasing the error of the compressed voltage. To remove this disadvantage, the prior art circuit required power supply voltage stabilizer to improve performance.

Furthermore, since it is such a low level signal, the compressed voltage will be affected comparatively largely by the ambient temperature. In addition, if an unbalanced temperature distribution exists in the circuit, the compressed voltage will also be affected by the thermodynamically converted voltage which may be caused by the Seebeck effect, Thomson effect, Peltier effect, etc. and the error in the compressed voltage will further be increased. The operation characteristics of the semiconductor elements included in the circuit are also influenced by their operating temperatures, so that the circuit requires a suitable temperature compensation device. All these disadvantages encountered in the prior art circuit flow from the use of such a low compressed voltage. As one apporach to increasing the compressed voltage, it has been proposed to use a number of compression element. This approach, however, is not very effective because the compressed voltage provided by the individual compression element or diode is limited but, on the contrary, will increase the non-linearity of the compressed voltage, resulting in an increased error.

SUMMARY OF THE INVENTION

This invention is directed to overcoming the problems that are incident to providing exposure factor control in connection with such low level signals as the above-described logarithmically compressed voltage.

An arrangement according to this invention is included in a camera having a shutter mechanism and a shutter button. The shutter mechanism includes an electromagnet, a front curtain that moves upon actuation of the shutter button, and a rear curtain that is released incident to electrical control of the electromagnet so as to move in spaced relationship with the front curtain. The arrangement provides for controlling the exposure time of the shutter mechanism in accordance with the amount of light from an object to be photographed and with an exposure factor.

The arrangement includes first and second tandem-connected, separately controllable timing circuits operable for respectively defining in succession first and second sub-intervals of the exposure time. The first timing circuit commences to define the first sub-interval when the front curtain begins to move, and the second timing circuit electrically controls the electromagnet so that the rear curtain is released at the end of the second sub-interval. The arrangement further includes means for separately controlling the first and second timing circuits so that the duration of the first sub-interval is dependent upon the amount of light but, significantly is independent of the exposure factor. That is, the exposure factor control is not effected in the logarithmic compression section as has been the practice heretofore. Accordingly, the arrangement of this invention is not subject to the above-described problems. The exposure factor control is effected instead in the operation of the separately controlled second timing circuit.

DETAILED DESCRIPTION

General Description

The reason why the exposure factor control is effected more advantageously in accordance with this invention will be appreciated from the following. A given error, which may be equivalent to 1 LV, that originally exists in the compression section, will be reduced less than 1 LV in the expansion section. This is attributable to the fact that although the absolute value of the original influence of the temperature, voltage, etc. is equal to each other in both the compression section and expansion section, the influence obtained in the compression section is more extended during expansion than the influence obtained in the expansion section.

The foregoing will be explained mathematically as follows:

It is known that when a power voltage E is applied to a series circuit consisting of a photo conductor (hereinafter referred to as a CdS cell) and a logarithmic diode, the compressed voltage $V_D$ developed across the logarithmic diode has a magnitude expressed as $$V_D = k \ln i \qquad (1)$$

where, $i$ is the electric current flowing through the series circuit of the CdS cell and the logarithmic diode, and $k$ is a constant. Formula (1) shows that $V_D$ is the logarithmically compressed $i$. From Formula (1), it follows that:

$$V_D = k \ln E/R = k(\ln E - \ln R) \qquad (2)$$

where, R is the internal resistance of the CdS cell. It will be appreciated from Formula (2) that $V_D$ has a linearity. When an expansion process has been applied the following Formula will be obtained from Formula (1):

$$i = e^{k/V_D} \qquad (3)$$

It will be understood from Formula (3) that $i$ has been expanded in accordance with a power-of-2 series. In contrast with this, the compressed voltage $V_D$ varies at constant intervals. Since $V_D$ is included in Formula (3) as an exponent, $i$ is an exponential function of $V_D$. The control operation by use of $V_D$ will include a danger of accumulating the error, because the actual value of $V_D$ is very small. Whereas, the exponential function $i$ has a less influence over the control operation than $V_D$ because it has a larger value than $V_D$. According to this invention the exposure factor control is effected depending on the exponential function $i$ rather than on $V_D$.

DESCRIPTION OF THE ILLUSTRATED EMBODIMENTS

Figure 1:
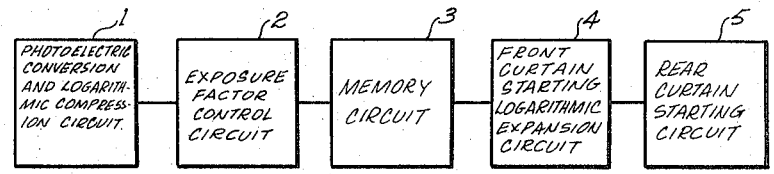
FIG. 1 is a block diagram illustrating the general arrangement of a prior art exposure-time control device.
Figure 2:
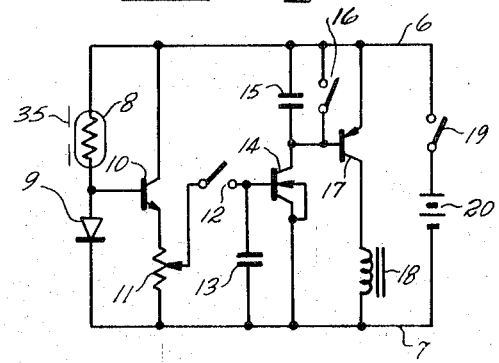
FIG. 2 is a circuit diagram of a conventional exposure-time control device embodying the arrangement of FIG. 1.
Figure 3:
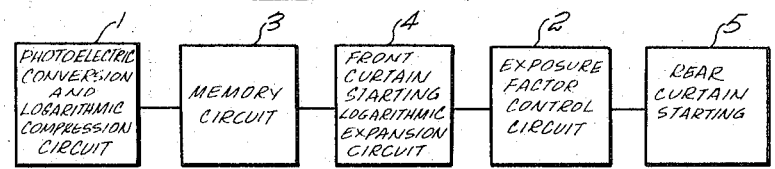
FIG. 3 is a block diagram illustrating the general arrangement of the arrangement of this invention.
Figure 4:
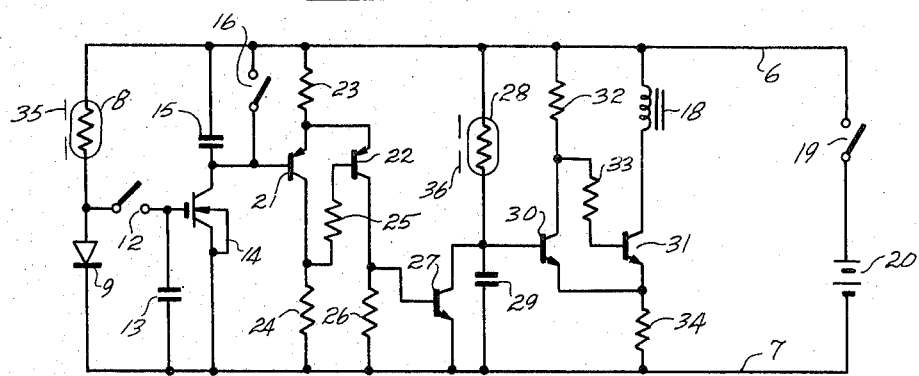
FIGS. 4-7 are circuit diagrams embodying the arrangement of FIG. 3.

Referring to FIG. 3, there is shown a block diagram of the shutter time control device according to this invention, wherein like reference numerals designate the corresponding portions of FIG. 1. FIG. 4 is a circuit diagram embodying the construction of FIG. 3, wherein like reference numerals designate the corresponding portions of the previous Figures.

In the circuit of FIG. 4, the series-connected CdS cell 8 and logarithmic compression diode 9 constitute a photoelectric conversion and logarithmic compression circuit. A logarithmically compressed voltage is developed at the connection point between the CdS cell 8 and the diode 9. The normally closed switch 12 provides for coupling this compressed voltage to the capacitor 13.

When the switch 12 opens incident to actuation of the camera shutter button (not shown), the capacitor 13 exhibits memory and the voltage thereacross controls a first of two tandem separately controllable timing circuits.

The first timing circuit includes a first timing network and a first Schmidt circuit. The first timing network comprises a field effect transistor (FET) 14 and a timing capacitor 14. The drain of the FET 14 is connected to the base of a transistor 21, and the emitters of transistor 21 and 22 are both connected to a positive bus 6 through a resistor 23. The collector of the transistor 21 is connected to resistors 24 and 25 of which other ends are connected to a negative bus 7 and the base of the transistor 22 respectively. The collector of the transistor 22 is connected to both a resistor 26 and the base of a transistor 27. The other end of the resistor 26 and the emitter of the transistor 27 are connected to the negative bus 7. The transistors 21 and 22 and their associated resistors constitute the first Schmidt circuit.

A transistor 27 effects the tandem connection between the first and second timing circuits.

In the second timing circuit there is a timing network comprising CdS cell 28 and a capacitor 29 which are serially connected together and also connected between the positive and negative buses 6 and 7. So as to separately control the second timing network an exposure factor controlling diaphragm 36 is provided. The CdS cell 28 receives the light coming from the object through the diaphragm 36. The connecting point between the CdS cell 28 and the timing capacitor 29 is connected to the collector of the transistor 27 and to the base of a transistor 30 which has its collector connected to resistors 32 and 33. The other ends of the resistors 32 and 33 are connected to the positive bus 6 and the base of a transistor 31 respectively. The emitters of the transistors 30 and 31 are both connected to the negative bus 7 through a resistor 34, and the collector of the resistor 31 is connected to the positive bus 6 through the coil 18 for driving the rear curtain. The transistors 30 and 31 and their associated resistors constitute the second Schmidt circuit.

The operation of the circuit arrangement of FIG. 4 will now be described. When the power switch 19 is closed the Cds cell 8 and logarithmic diode 9 cooperate to photoelectrically convert the light from the object to be photographed and logarithmically compress the thusly obtained photoelectric voltage. The logarithmically compressed voltage is then stored in the memory capacitor 13 through the switch 12. Upon depression of the shutter release button (not shown), the switches 12 and 16 open and hence the front curtain of the shutter mechanism (not shown) starts to move. At the same time, the capacitor 15 starts to be charged through the FET 14 which serves as a logarithmic expansion type variable resistance element. During closure of the power switch 19 the first Schmidt circuit is in a rest state, so that the transistor 22 conducts. This in turn drives the transistor 27 into conduction whereby the capacitor 29 is short circuited. Therefore, no charging current flows into the capacitor 29. When the terminal voltage across the capacitor 15 reaches a predetermined trigger level, the first Schmidt circuit changes state whereby transistor 22 becomes non-conductive, which in turn makes the transistor 27 non-conductive.

The quantity of the light coming through the diaphragm 36 is controlled depending on the exposure factors and hence the internal resistance of the CdS cell 28 varies. When transistor 27 becomes non-conductive, charging current begins to flow through the capacitor 29 with the CdS cell 28 serving as a timing resistor. When the voltage across the capacitor 29 reaches a predetermined trigger level the second Schmidt circuit changes state, so that the coil 18 is electrically controlled to release the rear curtain (not shown). Upon its release, of course, the rear curtain moves in spaced relation with and along the same path behind the front curtain.

The operation of the shutter time control device according to this embodiment will be explained mathematically. Assuming that the internal resistance of the FET 14 be $R_1$ and the capacitance of the capacitor 15 be $C_1$, then the terminal voltage $V_{c1}$ across the capacitor 15 at the time when the switch 16 opens will be expressed by a known formula as follows:

$$V_{c1} = E \,(1 - e^{-t_1/R_1 C_1})$$

where, E is the power voltage and $t_1$ is the duration of a sub-interval of time during which the capacitor Cl has been charging. From this Formula, it follows that:

$$t_1 = R_1 C_1 \, ln \,(E/E - V_{c1}).$$

(4)

Assuming that the circuit consisting of the CdS cell 28 and capacitor 29 starts its timing operation after the lapse of said time $t_1$, the internal resistance of the CdS 28 is $R_2$, the capacitance and the terminal voltage of the capacitor 29 are $C_2$ and $V_{c2}$ respectively, then the charge time $t_2$ will be expressed as:

$$t_2 = R_2 \, C_2 \, ln \,(E/E - V_{c2}).$$

(5)

It is known that the shutter time T is the sum of the successively occurring sub-intervals of time $t_1$ and $t_2$. Therefore, by substituting Formulas (4) and (5), T will be expressed as:

$$T = R_1 \, C_1 \, ln \,(E/E - V_{c1}) + R_2 \, C_2 \, ln \,(E/E - V_{c2}).$$

Provided that $C_1$, $C_2$, C and $V_{c1}$, $V_{c2}$, $V_C$ are so predetermined as $C_1 = C_2 = C$ and $V_{c1} = V_{c2} = V_C$, the preceding Formula will be transformed as:

$$T = (R_1 + R_2) \, C \, ln \,(E/E - V_C).$$

(6)

A characteristic feature of this invention lies in that the exposure control is effected by varying $R_2$ of Formula (6). Preferably, the diaphragm 36 is so preset that the relation of $R_2 = nR_1$ is obtained. In this way, the duration of the second sub-interval of time ($t_2$) is an integral multiple of the duration of the first interval of time. Under these circumstances, it follows that:

$$T = (R_1 + nR_1) \, C \, ln \,(E/E - V_C)$$
$$= (1 + n) \, R_1 \, C \, ln \,(E/E - V_C). \quad (7)$$

It will be appreciated from this Formula that the exposure factor control can be attained by suitably selecting the value of $1 + n$ depending on the exposure factor.

So long as the relationship of $R_2 = nR_1$ is satisfied, the CdS cell 28 may be controlled either by directing to it the external natural light adjusted by the diaphragm 36 or by illuminating it by the light from an electric bulb which is adjustable without using the diaphragm 36. When an external natural light is used no difficulty will be encountered, because the variation in the quantity of the incident light onto the CdS 8 is identical with the variation in the quantity of the incident light onto the CdS 28. Whereas, when the electric light bulb light is projected onto the CdS 28 the quantity thereof must be varied automatically with the variation in the quantity of the light from the object, so that the device will become more complicated than when the external natural light is used.

Figure 5:
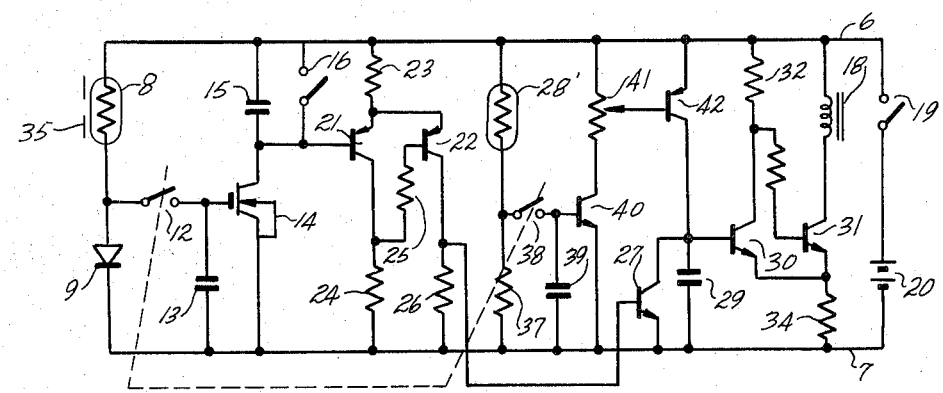

FIG. 5 is a circuit diagram of another embodiment of this invention, wherein like numerals designate the corresponding portions of FIG. 4. In this embodiment the exposure factor control is effected in a simple manner without using an additional diaphragm for a CdS cell 28' which, unlike in the embodiment of FIG. 4, is arranged in the optical system including the CdS 8 so that a single photographing lens diaphragm 35 will meet all the requirements. The CdS cell 28' and a resistor 37 are serially connected together and connected across the positive and negative buses 6 and 7. The connecting point between the CdS cell 28' and the resistor 37 is connected to the base of a transistor 40 and to a memory capacitor 39 through a normally closed switch 38 which opens in association with the opening of the switch 12 upon depressing the shutter release button. The other end of the memory capacitor 39 and the emitter of the transistor 40 are both connected to the negative bus 7, while the collector of the transistor 40 is connected to the positive bus 6 through a variable resistor 41. The slider of the variable resistor 41 is connected to the base of a timing transistor 42 which serves as a variable resistance element for controlling the exposure factor. The emitter of the transistor 42 is connected to the positive bus 6 and the collector of the transistor 42 is connected to the collector of the transistor 27, capacitor 29 and the base of the transistor 30.

In this embodiment the internal resistance $R_3$ of the transistor 42 is equivalent to the internal resistance $R_2$ of the CdS cell 28 of FIG. 4. Therefore, to attain the optimum exposure factor control the value of $R_3$ may be selected to be n times as large as the internal resistance $R_1$ of the FET 14.

According to this embodiment of the CdS cell 8 and CdS cell 28' are arranged to receive the light from the object coming through the same lens, so that the quantities of the light received by the CdS cells 8 and 28' are both $k_1R_1$ ($k_1$ is a constant). The base potential of the transistor 42, therefore, should be reduced by adjusting the variable resistor 41 so that the transistor 42 has an internal resistance of $nR_1$ which is $n/k_1$ times as large as the internal resistance $k_1R_1$ of the CdS cell 28'. In this way the internal resistance of the CdS cell 28', as well as that of the CdS cell 8, precisely corresponds to the light from the object, so that the internal resistance $R_3$ of the transistor 42 can vary while maintaining the relationship of $R_3 = nR_1$ at any time. When the light from the object reduces in quantity, for instance, the internal resistance of the CdS cell 28' increases and the input voltage into the transistor 40 reduces, increasing the internal resistance of the transistor 40. Consequently, the voltage applied to the base of the transistor 42 reduces and, hence, the internal voltage of the transistor 42 increases. On the contrary, when the light from the object is increased in quantity the foregoing operation may be reversed to obtain a desired result.

When the power switch 19 is closed, the memory capacitor 39 is charged through the switch 38 with the electric current obtained by photoelectrically converting the light from the object under control of the CdS cell 28' arranged in such a manner as described previously. A voltage corresponding with the voltage stored in the capacitor 39 appears through the transistor 40 across the variable resistor 41, which is then divided by operating the slider depending on the exposure factor. The thusly divided voltage can not be used to control the internal resistance of the transistor 42 which acts as a timing resistor.

At this time if the switch 12, 38 and 16 are caused to open in association with the actuation of the shutter release button to thereby start the front curtain, the preceding circuit stage operates in the same manner as in the previous embodiment and the transistor 27 becomes non-conductive after a sub-interval of time, so that charging into the capacitor 29 initiates through the transistor 42 and the rear curtain starts in just the same manner as in the previous embodiment.

Although the embodiment has been described as to effect the exposure factor control by use of the variable resistor 41, it may be carried out by adjusting a diaphragm arranged in front of the CdS cell 28'.

Figure 6:
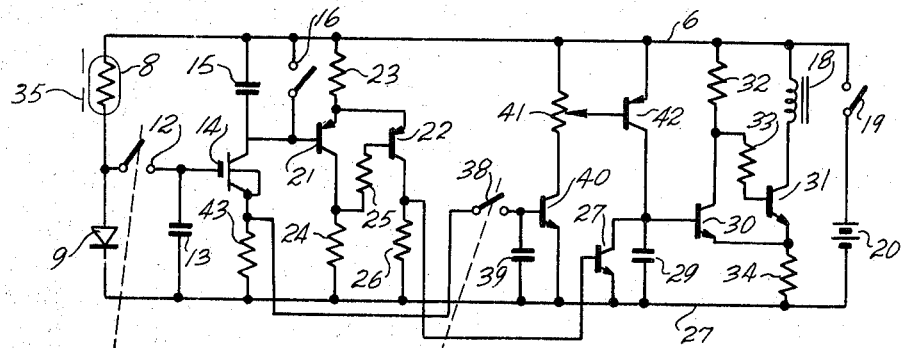

Now reference should be had to FIG. 6 illustrating another embodiment of this invention which has a circuit arranged in correspondence with the block diagram in FIG. 3. Unlike the embodiments shown in FIGS. 4 and 5, the embodiment of FIG. 6 is so arranged as to perform the exposure factor control in the logarithmic expansion section by use of only a single CdS cell. In FIG. 6 like numerals designate the corresponding portions of FIG. 5. In FIG. 6 the FET 14 is connected to the negative bus 7 through a resistor 43 and also connected to the normally closed switch 38.

According to this embodiment when the power switch 19 is closed photoelectrically converted and logarithmically compressed voltage which has been stored in the memory capacitor 13 is applied to the gate of the FET 14 through the switch 12. At this time a logarithmically expanded electric current flows through the FET 14 and a voltage drop appears across the resistor 43. The reduced voltage is then stored in the memory capacitor 39 through the switch 38 and the rear curtain starts in the same manner as described previously.

Figure 7:
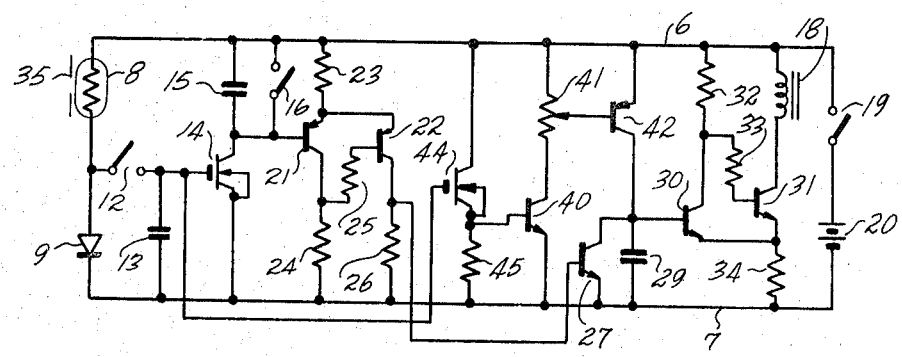

FIG. 7 illustrates still another embodiment of this invention having a general circuit construction corresponding to the block diagram in FIG. 3, in which a portion of the embodiment of FIG. 6 is modified by eliminating the resistor 43, switch 38 and memory capacitor 39 of FIG. 6, connecting the source terminal of the FET 14 to the negative bus 7 and providing with an additional FET 44 as a logarithmic expansion type variable resistance element arranged in such a manner that the drain thereof is connected to the positive bus 6 through the resistor 45, the source thereof to the base of the transistor 40 and the base thereof to the gate of the FET 14. The other arrangement is identical with FIG. 6. In this embodiment a voltage develops across the resistor 45 due to the electric current expanded by the FET 44 which receives the voltage of the memory capacitor 13 at its gate. Said voltage plays substantially the same role as the voltage developed across the resistor 43 (FIG. 6) and makes the subsequent circuit operate in just the same manner as described previously for thereby starting the rear curtain.

In each of the previous embodiments a known logarithmic diode or a diode-connected transitor may be employed in place of said FET which is used as a logarithmic expansion type variable resistance element.

It will be appreciated from the foregoing that there has been disclosed a first timing circuit provided with a logarithmic expansion type variable resistance element as a timing resistor, the circuit being arranged as to start operation simultaneously with the shutter opening upon actuation of the shutter release, said variable resistance element being controlled by the voltage stored in a circuit adapted for photoelectrically converting the light coming from the object to be shot through the photographing lens, then logarithmically compressing the resulted photoelectric voltage and storing the thusly compressed photoelectric voltage; and a second timing circuit provided with a photoelectric element or other variable resistance element as a timing resistor, this circuit being arranged as to initiate operation upon receipt of the output from the first timing circuit and develop an output which is used to close the shutter, said timing resistor being controlled depending on the exposure factor. In comparison with the prior art technique wherein various difficulties and disadvantages are encountered as mentioned previously due to the fact that the exposure factor control is carried out in the compression section, the present invention allows an accurate exposure time control by elmininating these difficulties and disadvantages and minimizing the influence of the fluctuation in the voltage which results from both the internal and external causes such as the noise voltages, fluctuation in the power voltage, voltage dividing errors at the variable resistor and the variation in the ambient and operational temperatures.

What is claimed is:

1. In a camera having a shutter button and a shutter mechanism having an electromagnet, a front curtain that moves upon actuation of the shutter button, and a rear curtain that is released incident to electrical control of the electromagnet so as to move in spaced relation with the front curtain, an arrangement for controlling the exposure time of the shutter mechanism in accordance with the amount of light from an object to be photographed and with an exposure factor, which comprises:

first and second tandem-connected, separately controllable timing circuits operable for respectively defining in succession first and second sub-intervals of the exposure time, the first timing circuit commencing to define the first sub-interval when the leading curtain begins to move, and the second timing circuit electrically controlling the electromagnet so that the rear curtain is released at the end of the second sub-interval; and means for separately controlling the first and second timing circuits so that the duration of the first sub-interval is dependent upon said amount of light but is independent of said exposure factor and the duration of the second sub-interval is dependent upon both said amount of light and said exposure factor.

2. An arrangement according to claim 1 wherein said means includes a memory capacitor, a circuit including an element for photoelectrically converting said amount of light and a logarithmic compression device, said circuit providing a voltage to the memory capacitor, and wherein the first timing circuit is controlled by said voltage to define the first sub-interval in proportion to the magnitude of said voltage.

3. An arrangement according to claim 2 wherein the first timing circuit includes a timing network comprising a logarithmic expansion type variable resistance element serving as a timing resistor, said variable resistance element being controlled by said voltage.

4. An arrangement according to claim 3 wherein the second timing circuit includes a timing network comprising an element for photoelectrically converting the amount of light impinging upon it; and said means including an exposure factor control arrangement for permitting a controlled portion of the light from the object to impinge upon said element of the second timing circuit.

5. An arrangement according to claim 3 wherein the second timing circuit includes a timing network comprising a logarithmic expansion type variable resistance element serving as a timing resistor, and said means includes circuit means for switchably coupling a controlled portion of said voltage to control the variable resistance element of the second timing network.

* * * * *

UNITED STATES PATENT OFFICE
CERTIFICATE OF CORRECTION

Patent No. 3,852,776         Dated December 3, 1975

Inventor(s) Tsukumo Nobusawa

It is certified that error appears in the above-identified patent and that said Letters Patent are hereby corrected as shown below:

Column 2, line 62, "element." should read -- elements. --

Column 4, Formula (3) should read -- $i = e^{V_D/k}$ --

Column 6, Formula (4) should read -- $t_1 = R_1C_1 \ln(E)/(E - V_{C1})$ --

Column 6, Formula (5) should read -- $t_2 = R_2C_2 \ln(E)/(E - V_{C2})$ --

Column 6, line 35 should read $T = R_1C_1 \ln(E)/(E - V_{C1}) + R_2C_2 \ln(E)/(E - V_{C2})$ --

Column 6, Formula (6) should read -- $T = (R_1 + R_2)C \ln(E)/(E - V_C)$

Column 6, Formula (7) should read -- $T = (R_1 + nR_1)C \ln(E)/(E - V)$
$= (1 + n)R_1 C \ln(E)/(E - V)$ Column 8, line 5, "not" should read -- now --.

Signed and Sealed this fifth Day of August 1975

[SEAL]

Attest:

RUTH C. MASON
Attesting Officer

C. MARSHALL DANN
Commissioner of Patents and Trademarks